Jan. 18, 1966    A. SILVESTRI    3,229,565
OPTICAL COLORIMETRIC COMPARISON DEVICE
Filed Oct. 19, 1961    3 Sheets-Sheet 1

INVENTOR
ACHILLE SILVESTRI
BY
B. L. Zangwill
ATTORNEY

INVENTOR
ACHILLE SILVESTRI

BY  B. L. Zangaril
ATTORNEY

Jan. 18, 1966    A. SILVESTRI    3,229,565
OPTICAL COLORIMETRIC COMPARISON DEVICE
Filed Oct. 19, 1961    3 Sheets-Sheet 3

INVENTOR
ACHILLE SILVESTRI

BY  B. L. Zangwill
ATTORNEY

United States Patent Office 3,229,565
Patented Jan. 18, 1966

1

3,229,565
OPTICAL COLORIMETRIC COMPARISON DEVICE
Achille Silvestri, Annapolis, Md., assignor to the United
States of America as represented by the Secretary of
the Navy
Filed Oct. 19, 1961, Ser. No. 146,380
1 Claim. (Cl. 88—14)
(Granted under Title 35, U.S. Code (1952), sec. 266)

The invention described herein may be manufactured and used by or for the Government of the United States of America for governmental purposes without the payment of any royalties thereon or therefor.

This invention broadly relates to a means and method for providing a colorimetric spectrum of colors; more particularly relates to the colorimetric determination of a condition of a liquid in those cases where the condition is attended by a distinctive color; and more specifically relates to a means and method for the visual colorimetric testing of water, such as for example boiler water, for pH or phosphate content.

Colorimetric means are known that provide standard or comparative colors to which a test color is compared for identifying the test color or a condition represented by the test color. An object of this invention is to provide an improved, inexpensive means of this kind with which any desired continuous spectrum may be obtained, and preferably one of limited range.

A further object of the invention is to provide a device for readily matching a test color to a standard spectrum including that color and for reading off a valve corresponding to that matching.

Another object of the invention is to provide a single colorimetric means that can be used for readily determining the pH content of water, preferably boiler water.

An important object of the invention resides in the simultaneous development of a color in an unknown or test liquid-sample and in an indicator solution or solutions, and relying on the developed colors of the solutions as standards, rather than on a pre-existing artificial standard such as a printed color chart. The development of the test and standard colors at the time of test insures uniformity of color shades and insures accurate matching of color-intensities even when partial deterioration or changes in an indicator reagent may have occurred, since both the test sample and the indicator solution will be affected in similar manners.

Briefly, the preferred embodiment of the invention comprises a housing or holder which has a mounting for a transparent rectangular container or comparison cell that is divided by a transparent transverse wall into two triangular or trapezoidal compartments, each of which receives a different colored "standard" liquid. The housing also includes a light means providing a ray of light that passes through the liquids in both compartments. By sliding the container relative to the light source, the light will shine through different lengths of the colored liquids, thereby providing a blend color on a continuous spectrum that varies from an end color that is the color of the liquid in one compartment to an end color that is the color of the liquid in the other compartment. The housing also has a mounting for receiving a test cell for a sample of the liquid undergoing test. A light ray also passes in a separate path through the test cell.

2

The container is slid on the housing until the colors of the rays passing through the test liquid and the container correspond or match. The relative positions of the container and test cell provide the desired indication. Scales may be provided for readily reading off such relative positions.

Other objects and many of the attendant advantages of this invention will be readily appreciated as the same become better understood by reference to the following detailed description when considered in connection with the accompanying drawings wherein.

Figures 1, 2:
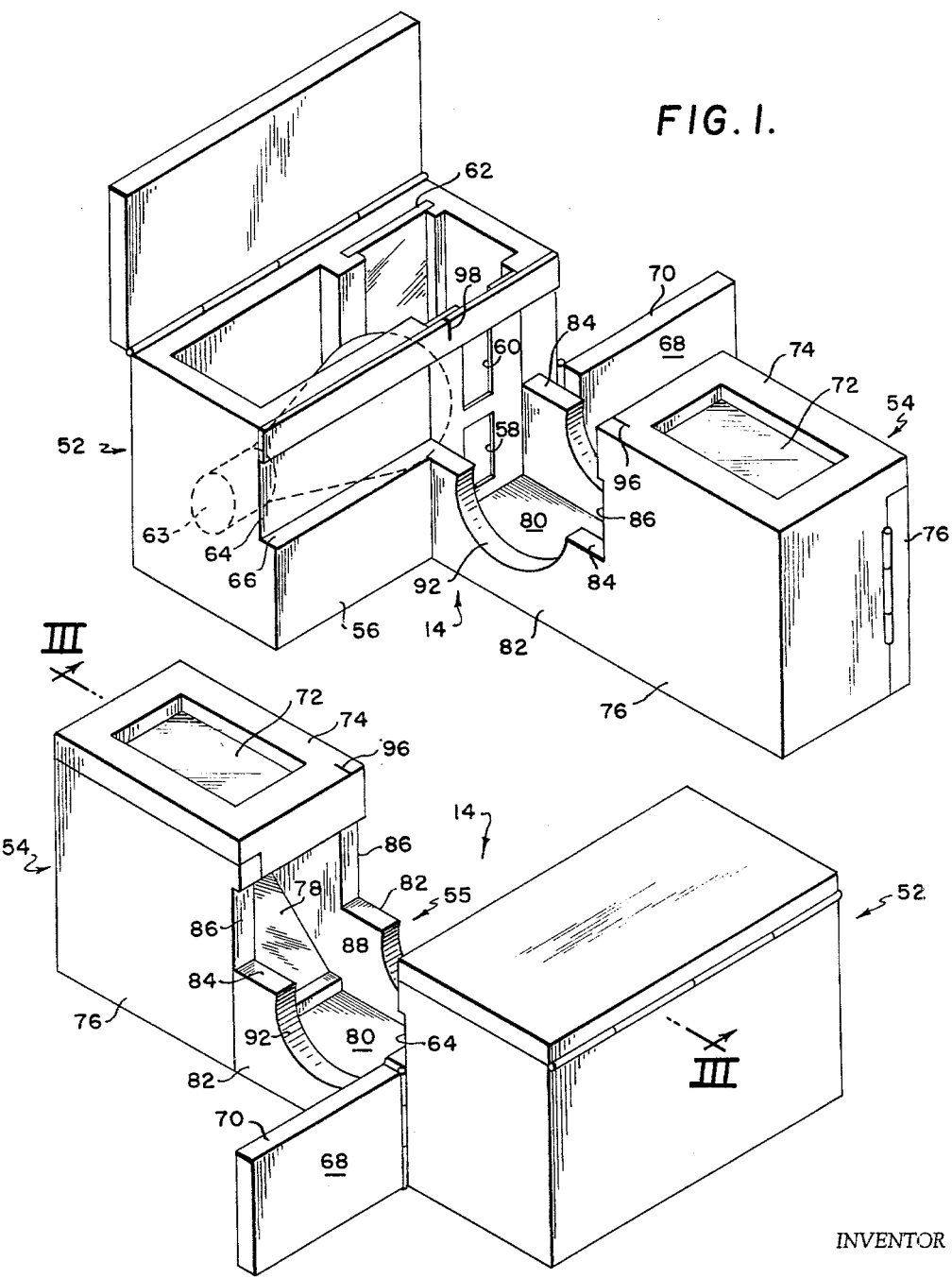
FIG. 1 is a diagrammatical perspective view, as seen from a particular angle, of a housing in accordance with a preferred form of the invention, but with the standard-solution container and the test cell omitted.
FIG. 2 is a diagrammatical perspective view of the housing, as seen from another angle.

Colorimetric equipment of the preferred embodiment of the invention comprises a main housing, a container for a pair of standardized colored liquids, and a test cell or container for a sample of the liquid to be investigated. The housing, container, and cell are indicated in their entireties by the reference numerals 14, 16 and 18, respectively.

Figure 5:
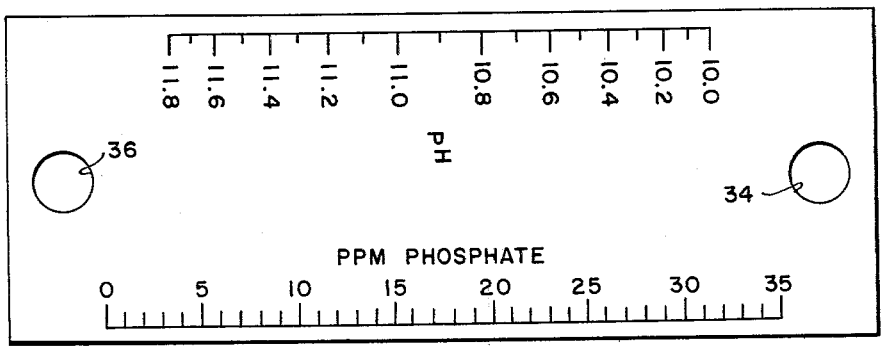
FIG. 5 is a plan view, to scale, of the top surface of the container and shows the pH and phosphate content scales thereon.
Figure 4:
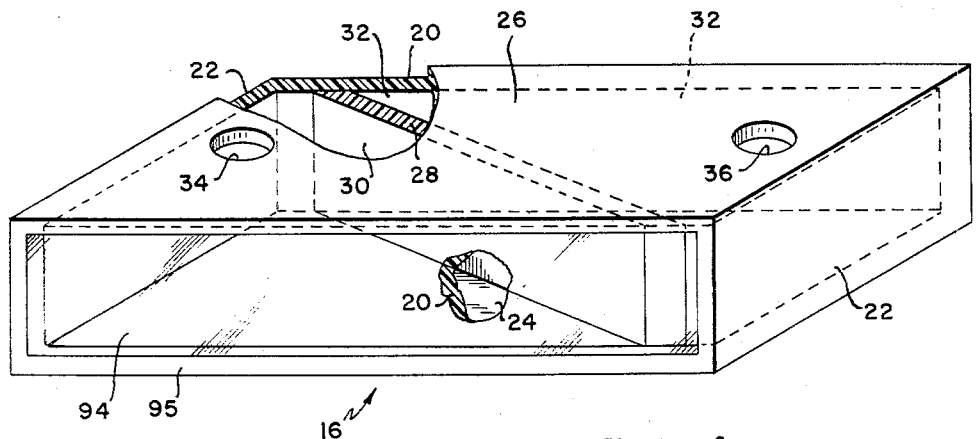
FIG. 4 is a diagrammatical perspective view with parts broken away of the container, but with reading scales thereon omitted.

The container 16, shown more particularly in FIGS. 4 and 5, is a hollow rectangular prism having a pair of lengthwise front and back walls 20, end side walls 22, a bottom wall 24, and a top wall 26. A transverse or diagonal inner wall or partition 28 divides the container into two generally triangular compartments 30 and 32 extending in opposite directions so that their hypotenuses face each other. The wall 28 terminates slightly short of the corners of the container, so that each compartment is actually a right-angled trapezoid with a side extending from a side wall 22, as is shown in FIG. 4.

The compartments 30 and 32 are liquid-tight except for such openings as are provided in the top wall 26 which includes the spout-openings 34 and 36 for filling and draining the compartments, although additional openings may obviously be provided. Consequently, each compartment is, in a sense, a separate container.

Figure 7:
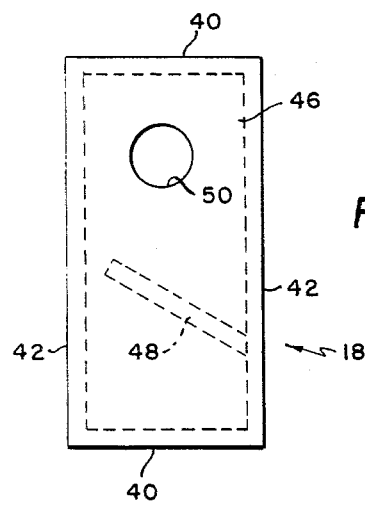
FIG. 7 is a plan view of the painted test cell.
Figure 6:
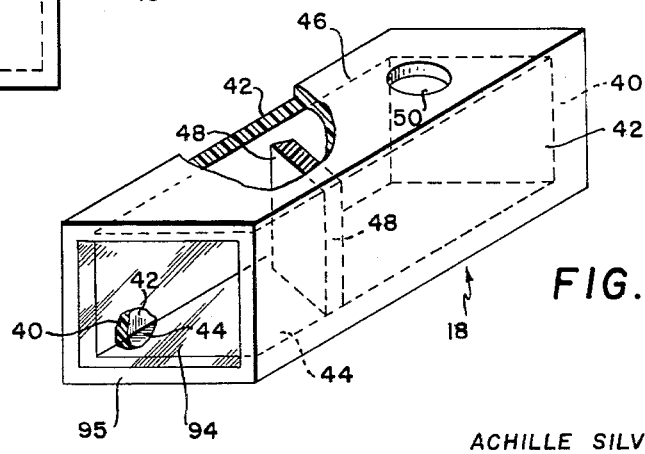
FIG. 6 is a diagrammatical perspective view of the test cell with parts broken away.

The test cell 18, shown more particularly in FIGS. 6 and 7, also is a hollow rectangular prism having front and back walls 40, side walls 42 along the longer dimension of the cell, a bottom wall 44 and a top wall 46. A baffle wall 48 is centrally disposed in the cell at an angle, and extends almost but not quite across the inside hollow of the cell so as to permit the cell to be filled with test liquid poured through a spout-opening 50 in the top wall 46.

The front and back walls of the container 16 and test 18 are transparent to light. The partition 28 and baffle 48 are similarly transparent.

Preferably, the container and cell are made of the same material of uniform thickness. The material should be stiff; and in an actual structure embodying the preferred form, a clear plastic was used. Any suitable plastic may be used; and in the actual structure the container and cell were made of a material sold under the trademark "Plexiglas" the container being 6¾″ x 2½″ x 1″, and the cell being 1¼″ x 2½″ x 1″.

After being filled with liquid as subsequently described, the container and cell are placed in the main housing 14. To this end, the housing comprises a unitary structure including a box-like light means indicated in its entirety by the reference numeral 52, a box-like viewing means indicated in its entirety by the reference numeral 54, and an interconnecting mounting section 55 between the light means and viewing means, the mounting means providing a positioning support for the container and cell. The light means and viewing means are preferably of the same height.

The light means 52 is a box having a hinged top and a front wall 56. The box is opaque except for two similar vertically aligned openings or windows 58 and 60 in a recessed portion of the front wall. Immediately in back of the windows, the inside of the back wall of the box comprises a white glazed ceramic tile reflector 62 that extends for the inner height of the box and is wider than the windows. The box also contains a single lamp bulb or light source 63, energized in any suitable manner, which is at one side of the reflector 62 so that light from the light source is reflected by the reflector through the windows 58 and 60. The bulb 63 may be an ordinary tungsten-filament household bulb.

The outer part of front wall 56 of the light-providing means 52 has a rectangular groove 64 in which an edge of the container 16 can guidably slide. The groove 64 has a lower surface 66 on which the container is supported in part. An extension wall 68 is hinged to the box of the light-providing means 52 and has an upper surface 70 on the same level as the guide-surface 66. When the wall 68 is extended, its surface 70 forms a further support for the container 16.

The viewing means 54 is also a box which has opaque walls except for a glass viewing window or screen 72 in its top wall 74 and an open back wall that faces the windows 56 and 58 of the light-providing means 52. The box has side walls 76, one of which serves as a door for access to a flat mirror 78 within the box arranged at a 45° angle to reflect light from windows 58 and 60 upwardly onto the glass screen 72.

The container and cell supporting means between the light means 52 and viewing means 54 comprises a bottom wall 80 which is a planar extension of the bottom walls of the viewing box and light box, and a pair of similar side walls 82 which are extensions of the side walls of the viewing box but of lesser height. The side walls 82 have upper surfaces 84 on a level with the groove-surface 66 and extension-surface 70, so that these surfaces also provide support for the container 16. The back edges of the side walls 76 of the viewing box have recesses that with the contiguous surfaces 84 of the side walls 82 form grooves 86 for further guidably supporting an edge of the container. Consequently the total length of the side walls 82 and thicknesses of the grooves 64 and 86 correspond to the width of the container. In the specific application of the preferred container dimensions previously mentioned this was only enough over 2½ inches to permit the container to slide along its supporting surfaces without lateral displacement.

The bottom wall of the view box has a narrow strip 88 secured to it. The strip holds an edge of the mirror 78. The strip 88 is placed a distance from the front wall 56 of the light means 52 so as to provide a test-cell space between the view box and light box that fits and receives the test cell 18 so that the front wall of the cell faces the mirror 78 and the back wall faces the bottom window 60. The height of this space corresponds to that of the cell; and the container can slide over the top of the cell. The side walls 82 are provided with semi-circular finger holes 92 to permit the cell to be easily placed in position or removed.

For colorimetric comparisons, as subsequently described, the test cell 18 is placed in the test-cell space and then the container 16 is adjustably slid in the grooves 64 and 86. The container and cell are removed in the reverse order.

In the use of the equipment herein described, the two compartments 30 and 32 of the container 16 are filled with light-pervious liquids of different colors. When light passes through the container on a line substantially perpendicular to the front and back walls 20 of the container, the visible light will have a color that is a blend of those of the two liquids.

The proportions of the two colors in the blend will obviously depend on the position of the container with respect to the window 60. Referring to FIG. 4, the viewable color at the left end of the container will be that of the liquid in the compartment 30, and at the right end will be that of the liquid in compartment 32. At intermediate points between the ends, the viewable color will be determined by the respective lengths of the liquids in the compartments in the viewing direction. The viewable light passing through the left half of the container must pass through more of the liquid in the compartment 30 and less of the liquid in compartment 32. The reverse holds for light passing through the right half. The result is that along the length of the container a spectrum is viewable that varies at one end from the color of the liquid in compartment 30 to the color of the liquid in the compartment 32 at the other end.

Figure 3:
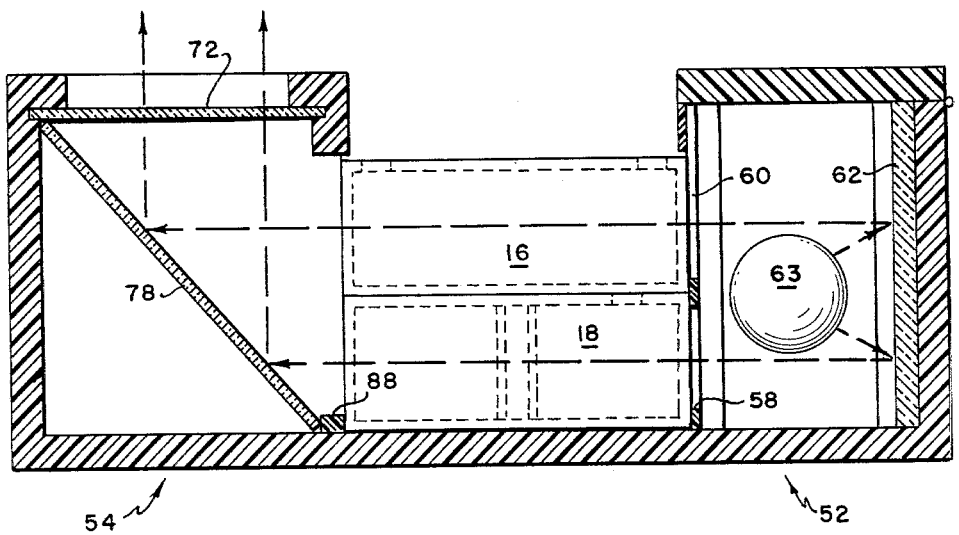
FIG. 3 is a sectional view of the housing taken on the line III—III of FIG. 2, but with the container and cell shown in elevation in position in the housing.

For color matching the color of a liquid in the test cell 18 to this spectrum, the cell is placed in the cell space, and the container above it in the housing 14. As indicated in FIG. 3, the light shining through bottom window 58 passes through the test cell and takes on the color of the cell. This colored light is reflected upwardly by mirror 78, and appears on screen 72. The light shining through upper window 60 passes through the container 16 and takes on the blend color corresponding to the particular position of the container with respect to this window. This blend color is reflected upward by mirror 78 and appears on screen 72 alongside the test cell color. For matching the colors, the container is moved lengthwise until the colors match. If the viewed colors of the container are standardized, then the position of the container with respect to the cell at the matching point provides information about the liquid in the test cell.

Since colors are to be compared, it is helpful to paint all surfaces of the container and cell with a dark, preferably black, paint, except the surfaces through which light is to pass. An example of this treatment is indicated in FIGS. 4 and 6 wherein the entire exteriors of the container and cell are painted black with the exception of the major part of their front and back walls, so that, in effect, transparent front and back windows 94 are provided in these walls, defined by black borders 95. The test cell 18 is similarly painted.

Before any test determination is made, the container and test cell should be rinsed clean, preferably with a last rinse with distilled water, should be drained thoroughly of excess water, and if possible allowed to dry in cases where the possibility of slight error is to be minimized.

The above-described colorimetric comparison means lends itself to any adaptable procedure, such as for example, the determination of the pH content and phosphate content of boiler water. To this end, standardized colors are provided in the compartments 30 and 32 by standardized solutions, and scales are provided on the top black surface of the container 16, as shown in FIG. 5. The lower scale is calibrated for phosphate content in parts per million (p.p.m.) of the test liquid, and the upper scale for pH values. A marker 96 on the outside of the viewing means provides the point for reading either scale, but obviously an additional marker 98 on the opposite outside of the light means may be provided if desired. When only one marker is used, the container may be planarly turned through 180°. It is understood that the scales have been carefully applied previously to the container through measurements against known laboratory or similar standards.

Preferably, in accordance with the invention, each test consists of chemically producing a color in a sample of boiler water and comparing this color with that of one or more standard colors produced in the same procedure. The prepared test sample is transferred to test cell, and the standard to the comparing container. When the colors are matched, the value of the proper scale at the marker is read. Such a procedure may be used in many different applications, but is herein described in connection with the determination of the pH and phosphate content of boiler water.

In determination of the pH content of the boiler water, a standard indicator solution is provided. Such an indicator may comprise a dry mixture, by weight, of 65 to 75 percent Alizarin Yellow R and 35 to 25 percent Alphazurine, in distilled water, the mixture being dissolved, as needed, in ratio of one-tenth gram of mixture to 60 cubic centimeters of the water. Such an indicator solution is utilizable as an alkalinity indicator within a range of pH between 10.1 and 12.

The above-described indicator has a green color in a relatively acidic solution of a pH of about 10 or lower and a reddish-brown color in a relatively basic solution of a pH of about 12, or higher. In the intermediate pH ranges the color goes from the green to yellow to the reddish-brown with gradual change. A continuous spectrum of this color variations is obtained with the described apparatus. To this end, a standardized acidic solution is poured through spout 34 nearest the 10 pH on the pH scale, thereby providing the green standardized color in the compartment 30; and a standardized basic solution is poured through spout 36 nearest the other end of the pH scale, thereby providing the reddish-brown standardized color in the compartment 32. Different compositions or blends of these colors will be visible on the viewing screen 72 as the container is moved to different positions in front of the upper window 60, until a match is obtained with the test color of the sample of prepared boiler water in the test cell 18. The pH value will then be read from the pH value at the marker.

The standardized acidic solution for the green color is made with ingredients in proportions of 100 cubic centimeters of boiler water, a six-tenths of a gram of monosodium phosphate, and one cubic centimeter of the indicator solution. These ingredients may be initially mixed in a clean flask and then poured into the compartment 30.

The standardized basic solution for the reddish-brown color is made with ingredients in proportions of 100 cubic centimeters of boiler water, one-half cubic centimeter of a 50 percent solution of sodium hydroxide, and one cubic centimeter of indicator solution. These ingredients may also be initially mixed in a clean flask and then poured in the compartment 32.

For the color comparison with the above solutions, the test cell contains boiler water and indicator solution mixed in proportions of 100 to 1; as for example 100 cubic centimeter of boiler water to one cubic centimeter of indicator solution.

Preferably, all solutions for a test are made with water from the same batches of water.

For different colorimetric tests the standardized solutions which may be different from the specific ones described, depending on the pH range or other quality to be colorimetrically ascertained.

It may be observed that in the apparatus described, the light travels the same distance and through the same plastic materials in passing through the container 16 and through the test cell 18. The baffle 48 is provided in the cell 18 to provide the same penetration for the light as is provided by the partition 28 in the container 16.

In the use of the equipment for determinations of the phosphate content of boiler water, shades of a single color may be utilized instead of a limited spectrum as in the pH determinations described. For phosphate content determinations, one compartment only of the container 16 is filled with a prepared standard color solution and the other compartment remains empty or is filled with clear distilled water. A procedure for phosphate content determinations is as follows:

(1) Take a sample of the boiler water; and if the phosphate content is in a low range of 0–30 p.p.m., pour 40 cubic centimeters (cc.) into an Erlenmeyer flask. If the phosphate content is in a range of 0–240 p.p.m. use 5 cc. of the test sample and add 35 cc. of distilled water.

(2) Pour 20 cc. of a prepared phosphate standard solution in another flask. This solution is disodium phosphate in a concentration to give 70 parts per million of the $PO_4$ radical in distilled water.

(3) Add 15 cc. of 6 normal sulphuric acid to each flask.

(4) Dissolve .12 gram of ammonium molybdate $$(NH_4)_6Mo_7O_{24}.4H_2O$$

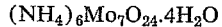

in each flask.

(5) Add .12 gram of ascorbic acid $C_6H_8O_6$ to each flask.

(6) Heat both solutions to the boiling point, and boil for one or two minutes.

(7) After cooling in any suitable manner, as by running tap water over outside of flasks, add to each flask enough distilled water to make 100 cc. of each solution.

(8) Pour treated standard solution in the compartment of the container that is under the pH scale in the embodiment described, and pour distilled water in the other compartment. Both compartments should be filled.

(9) Fill the test cell with the treated boiler water.

(10) Match the colors in the equipment, the colors being shades of blue.

(11) Read the phosphate scale. The value read is direct for the low range (0–30 p.p.m.), and is to be multiplied by eight for the other range.

Obviously many modifications and variations of the present invention are possible in the light of the above teachings. It is therefore to be understood that within the scope of the appended claims the invention may be practiced otherwise than as specifically described.

What is claimed is:

A colorimetric comparision device comprising:

a first chamber;

a source of light in said first chamber;

light reflecting means mounted within said first chamber for diffusedly reflecting the light from said source;

a second chamber;

means forming a third chamber interconnecting said first and second chambers;

a transparent walled sample cell adapted to fit within said third chamber;

a transparent walled comparison cell having a diagonal inner wall and adapted to fit between said first and second chambers;

said third chamber being of less height than said first and second chambers and providing a support for said comparison cell;

said first chamber having a pair of openings in the side adjacent said third chamber to allow the light reflected from said light reflecting means to enter the sample cell and said comparison cell respectively;

said second chamber having an opening for receiving light transmitted through the sample cell and the comparison cell including means for simultaneously displaying the light transmitted through the sample cell and the comparison cell for purposes of color comparison;

said sample cell is constructed from the same type of material and of the same thickness as the material from which the comparison cell is constructed; and a baffle of this material being mounted in said sample cell to provide the sample cell with an internal optical light path of substantially equal length to that of the comparison cell.

References Cited by the Examiner

UNITED STATES PATENTS

| | | | |
|---|---|---|---|
| 1,616,092 | 2/1927 | Stirlen | 88—14 |
| 1,675,967 | 7/1928 | Zitkowski | 88—14 |
| 2,050,608 | 8/1936 | Hellige | 88—14 |
| 2,117,135 | 5/1938 | Bissell | 88—14 X |
| 2,682,801 | 7/1954 | Davidson et al. | 88—14 X |

JEWELL H. PEDERSEN, *Primary Examiner.*

DAVID H. RUBIN, *Examiner.*

T. L. HUDSON, *Assistant Examiner.*